United States Patent [19]

Pearman et al.

[11] Patent Number: 4,918,995

[45] Date of Patent: Apr. 24, 1990

[54] ELECTRONIC GAS METER

[75] Inventors: Arthur N. J. Pearman, St. Paul; Gerald D. Hunter, Lino Lakes; Michael A. Woessner, Golden Valley; Robert E. Gilman, St. Michael, all of Minn.

[73] Assignee: Gas Research Institute, Chicago, Ill.

[21] Appl. No.: 140,714

[22] Filed: Jan. 4, 1988

[51] Int. Cl.$^5$ .............................................. G01F 1/68
[52] U.S. Cl. ............................. 73/861.02; 73/204.11; 73/204.26
[58] Field of Search ..................... 73/204, 861, 861.02, 73/861.03, 861.77, 861.78, 204.11, 204.26

[56] References Cited

U.S. PATENT DOCUMENTS

| 4,093,871 | 6/1978 | Plumb et al. ................. 73/861.03 X |
| 4,306,457 | 12/1981 | Fukui et al. ...................... 73/861.77 |
| 4,308,753 | 1/1982 | Olson .......................... 73/861.13 X |
| 4,353,118 | 10/1982 | Heimgartner et al. ........... 73/861 X |
| 4,375,667 | 3/1983 | Buchan ............................. 73/861 X |
| 4,414,634 | 11/1983 | Louis et al. ................. 73/861.03 X |
| 4,481,827 | 11/1984 | Bilstad et al. ......................... 73/861 |
| 4,534,218 | 8/1985 | Ueno . |
| 4,628,743 | 12/1986 | Miller, Jr. et al. . |
| 4,637,253 | 1/1987 | Sekimura et al. . |
| 4,651,564 | 3/1987 | Johnson et al. . |
| 4,669,301 | 6/1987 | Kratt et al. . |
| 4,682,496 | 7/1987 | Miura et al. . |

OTHER PUBLICATIONS

ON SET Computer Corp., "TATTLETALE ® Model III", Application Note, pp. 4, 5 and 10–11.
QUARTIC Systems, Inc., "TADC-1 User's Manual", Manual 0017-01, 1987.

Primary Examiner—Herbert Goldstein
Attorney, Agent, or Firm—Thomas W. Speckman

[57] ABSTRACT

An electronic compact gas meter includes a solid state flow sensor for sensing gas flow rate, data acquisition circuits including an analog-to-digital converter coupled to the sensor for controlling same and providing an output indicative of gas flow, and a digital data processor for receiving the gas flow information from the analog-to-digital converter, processing the information and registering the volumetric gas flow reading at the meter and/or transmitting the volume flow information via RF or telephone communication lines to a remote location.

21 Claims, 9 Drawing Sheets

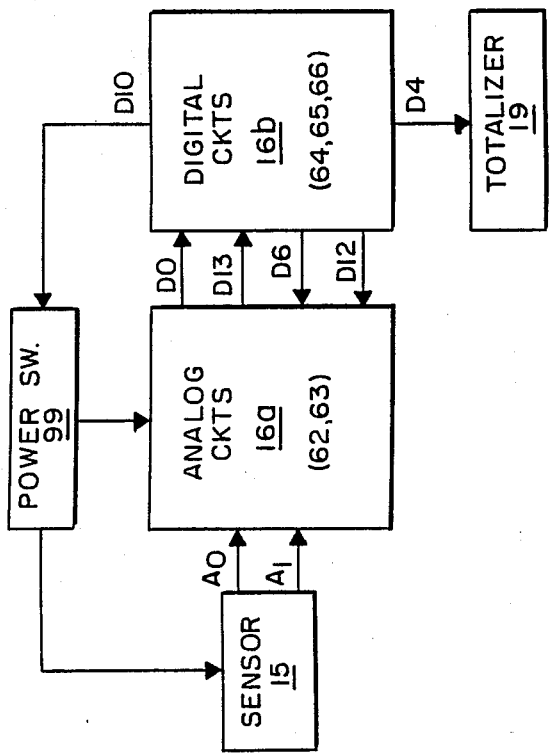
FIG. 10
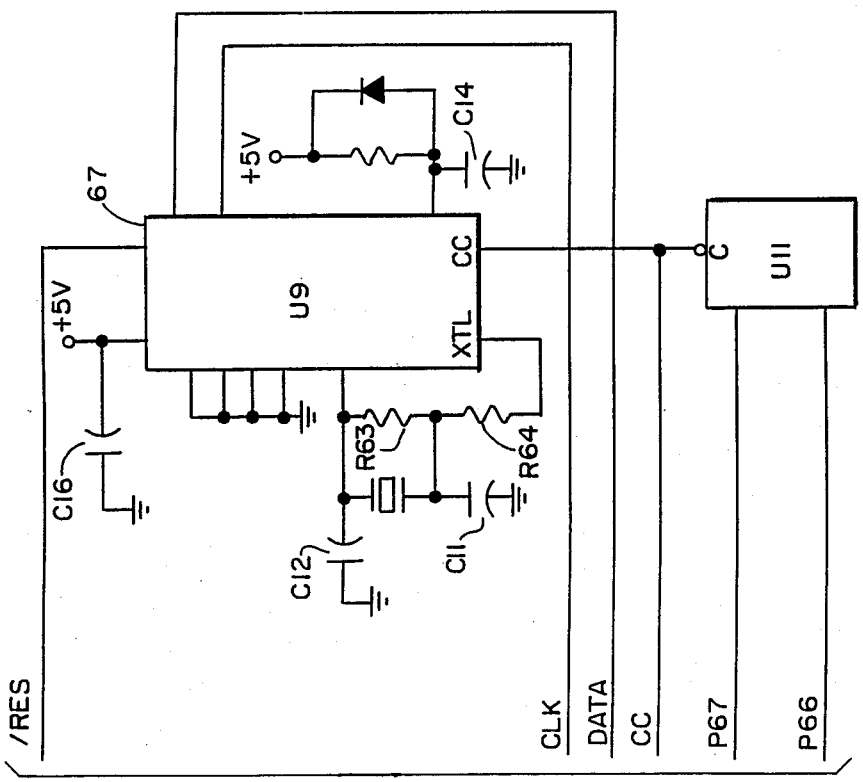
FIG. 9A
FIG. 9

ELECTRONIC GAS METER

BACKGROUND OF THE INVENTION

This invention relates to apparatus for measuring usage of a commodity, and more particularly to an electronic compact meter for measuring consumption of natural gas.

Existing natural gas meters often do not meet modern expectations for allocating costs fairly to the end users. For example, in multi-family dwellings, it is difficult to cost-effectively measure gas usage for each user to promote fair billing and encourage conservation of gas. It is often difficult to access the meter in multi-family dwellings for reading, inspection and maintenance. Theft and vandalism are also a significant problem to the gas utility industry. Moreover, installation costs and space are problems because of meter size and configuration.

It would be desirable to have an electronic compact gas meter for either interior retrofit or for new installations that is small in size and low in cost to as to enable cost-effective measurement of usage of natural gas by a consumer. It would also be desirable to have a gas meter that would enable easy direct or remote reading, and that is compatible with current construction materials and utility operations.

SUMMARY OF THE INVENTION

Therefore, it is an object of the present invention to provide a new and improved natural gas meter.

A further object of the invention is to provide a compact gas meter for either interior retrofit or for new installations that is small in size and low in cost so as to enable cost-effective measurement of usage of natural gas by a consumer.

Yet another object is to provide a gas meter that enables easy direct or remote reading.

Another object of the invention is to provide an electronic compact natural gas meter which is easy to install, reliable in operation and rugged and unobtrusive in construction.

Yet another object of the invention is to provide a compact natural gas meter characterized by low cost and maintenance.

These and other objects are achieved by the present invention which is provided a compact electronic gas meter for measuring usage of natural gas or the like, which comprises a housing having a passageway therethrough with a gas inlet adapted for connection to a source of natural gas and a gas outlet adapted for connection to gas utilization means, gas flow sensing means mounted on the housing and including a solid state flow sensor and means of locating the flow sensor in the passageway and operable when energized for providing an output signal indicative of gas flow through the passageway; signal sampling means for periodically sampling the output signal provided by the flow sensor and generating a signal representative of gas flow volume over a predetermined time interval, the signal sampling means defining operating cycles for said flow sensor each cycle including an active period of a first duration and an inactive period of a substantially longer duration, &he flow sensor being energized to provide its output signal only during the active period of its operating cycle; and indicating means controlled by the sampling means to provide an indication of the gas flow volume measured by the gas flow sensor.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIGS. 9 and 9a are a schematic and partial block diagram of the digital signal processing circuit of the electronic circuits;

FIG. 10 is a functional block diagram of the gas meter electronic circuits; and, FIG. 11 and 11A are a flow chart illustrating the process.

Description of a Preferred Embodiment

Figure 1:
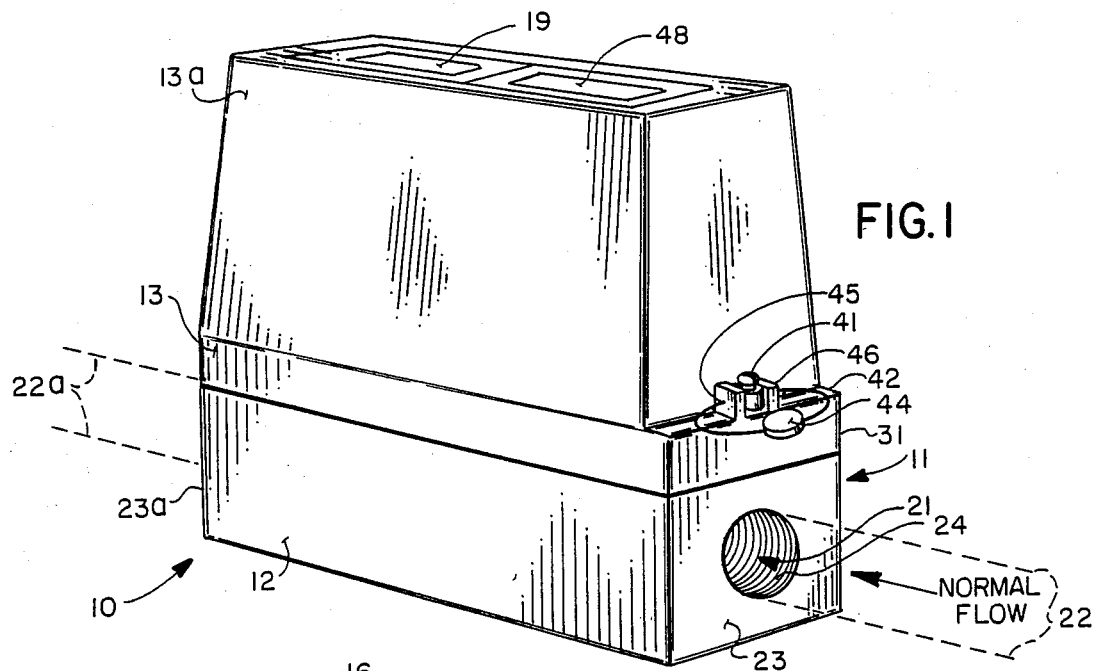
FIG. 1 is a perspective view of an electronic compact gas meter provided by the present invention.
Figure 2:
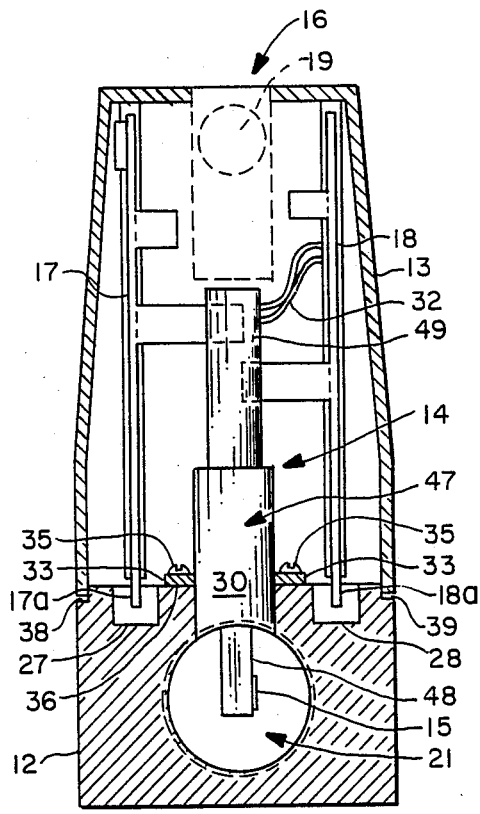
FIG. 2 is a vertical section view of the compact gas meter shown in FIG. 1.
Figure 3:
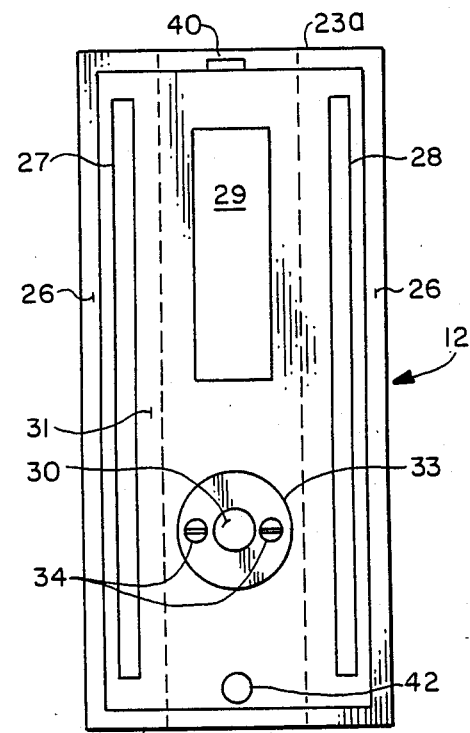
FIG. 3 is top plan view of the compact gas meter base with the printed circuit boards and battery removed.

Referring to FIGS. 1-3, the compact gas meter 10 provided by the present invention includes a two-part case including a base 12 and a cover 13, a flow sensor probe assembly 14 including a solid state sensor 15, and electronic signal processing circuits. The electronic circuits being carried on a pair of printed circuit boards 17 and 18 mounted on the base and enclosed within the cover 13. The compact gas meter 10 further includes an indicating device embodied as a mechanical totalizer 19 which provides a digital read out of the quantum of gas measured by the gas meter 10.

As will be shown, the solid state sensor 15 provides a signal output indicative of the volume of gas flow through the gas meter. The electronic signal processing circuits 16 sample the signal output of the flow sensor 15 periodically and generate a signal indicative of the gas flow volume measured by the gas meter over a given time period. This signal is applied to the totalizer 19 which records a reading representative of the cumulative gas flow volume measured by the gas meter. The flow sensor and electronic circuits of the gas meter are battery-powered and include low-power consuming elements which are operated in a manner so as to conserve the battery life. For example, the electronic circuits operate in an active mode during which the sampling operation is done and a sleep mode during which the flow sensor is deenergized and the electronic circuits are maintained at minimum power usage. Also, the use of a solid state flow sensing device and electronic signal processing circuits contribute to minimizing both the size of the gas meter and its cost and expanding its input/output capabilities, making the gas meter an attractive substitute for conventional gas meters either in new installations or in retrofit applications to existing installations.

Considering the meter 10 in more detail, the base 12 is generally rectangular in shape and has a through bore 21 extending along the longitudinal axis of the base 12 defining a gas flow passageway through the gas meter 10. The gas meter 10 is adapted for connection to a source of natural gas supplied to the gas meter 10 by a suitable gas conduit or pipe represented by the dashed line 22 in FIG. 1. The inner surface of the bore 21 at the upstream end 23 of the gas meter is formed with an internal thread 24 to facilitate coupling of the gas meter 10 to the pipe or gas conduit 22. Similarly, the downstream end 23a of the gas meter is formed with an internal thread (not shown) to facilitate attachment thereto of an outlet gas conduit or gas pipe which conduits the gas to one or more utilization devices. As will be shown, the gas meter can sense gas flow independent of direction, and thus, while for convention the gas meter 10 is described as having a gas inlet and a gas outlet, the meter can measure gas flow in either direction between the inlet and outlet. This affords a degree of protection against attempts at compromising the meter by reversing its connection in the gas lines. In the exemplary embodiment, the central bore 21 extends axially through the base 12, but it is apparent that the through bore could be offset laterally relative to the longitudinal axis of the base 12.

Referring to FIGS. 2 and 3, the upper surface 31 of the base 12 defines a peripheral shoulder 26, a pair of longitudinal channels 27 and 28. As shown in FIG. 2, channels 27 and 28 facilitate mounting of the printed circuit boards 17 and 18 which are mounted vertically within the gas meter 10 as shown in FIG. 2. The battery 29 energizes the electronic circuits of the gas meter 10. The battery used is one characterized by a long operating life, such as a lithium battery.

As shown best in FIG. 2, the base 12 has a vertically extending bore 30 which communicates the upper surface 31 of the base 12 with the through bore 21 and through which extends the flow sensor probe assembly 14. The channels 27 and 28 formed in the upper surface 31 of the base 12 are sized to receive the lower edges 17a and 18a of respective circuit boards 17 and 18, mounting the circuit boards 17 and 18 in a generally vertically extending position on the upper surface of the base 12. Circuit board 18 which carries the analog signal processing circuit 16a is electrically connected to the sensor probe assembly 14 by a set of conductors 32. Printed circuit board 17, which carries the digital signal processing circuit 16b, is interconnected with the printed circuit board 18 by suitable connectors (not shown) and hard wiring.

The flow sensor probe assembly 14 includes a mounting collar 33 in the form of an annular ring having diametrically opposed apertures 34 through which extend mounting screws 35 which are received in tapped holes 36 in the base near its upstream end 23.

Referring to FIGS. 1-3, the cover 13 has a generally trapezoidal shaped cross section with a broad base 38, the bottom edge of which is dimensioned to correspond generally to dimensions of the shoulder 26 on the upper surface 31 of the base 12, to facilitate mounting of the cover 13 on the base 12. A suitable sealing means 39 (FIG. 2) is provided between the base and the cover to provide a water tight seal therebetween.

As shown in FIGS. 1 and 2, the cover 13 encloses the upper surface 31 of the base 12 thereby containing the electronic circuits 16 therewithin. The cover 13 is secured to the base 12 by a closing screw 41 passing through a lip 42 on the cover 13 into base 12. The screw 41 may be wired closed by an antitampering device 44 which is shown in FIG. 1, which threads through apertures 45 in projections 46 on the lip 42 of cover 13.

Referring to FIGS. 1 and 2, the cover 13 has a window 48 formed therein in the top surface of the gas meter through which is exposed to view a totalizer 19 which is mounted on the inner surface of cover 13.

In one realization of the gas meter 10 which was constructed, the length of the base was approximately 6", the height of the meter from the bottom of the base to the top of the cover was approximately 4.5" and the width of the base was approximately 2". The base was made of a rigid material such as cast bronze and the cover 13 was made of a rigid material such as plastic or aluminum. The physical size is slightly less than 67 cubic inches for this realization. However, the specific dimensions recited are not intended to be a limitation on the scope of the invention, but rather to demonstrate the substantial reduction in size of the gas meter relative to gas meters presently in service. As indicated above, the gasket seal member 39 provides a water tight seal between the base 12 and the cover 13. Also, a suitable seal is provided between the gas inlet and outlet conduits 22, 22a (FIG. 1) and the base 12 of the gas meter, and the flow sensor probe assembly 14 is designed to provide a good gas seal under normal operating pressures.

Figure 2A:
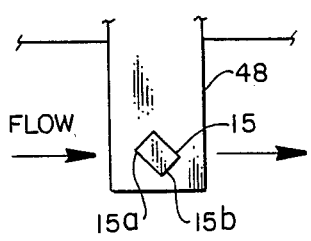
FIG. 2A is a simplified representation of the probe assembly of the gas meter, showing the orientation of the solid state sensor relative to the duration of gas flow.
Figure 4:
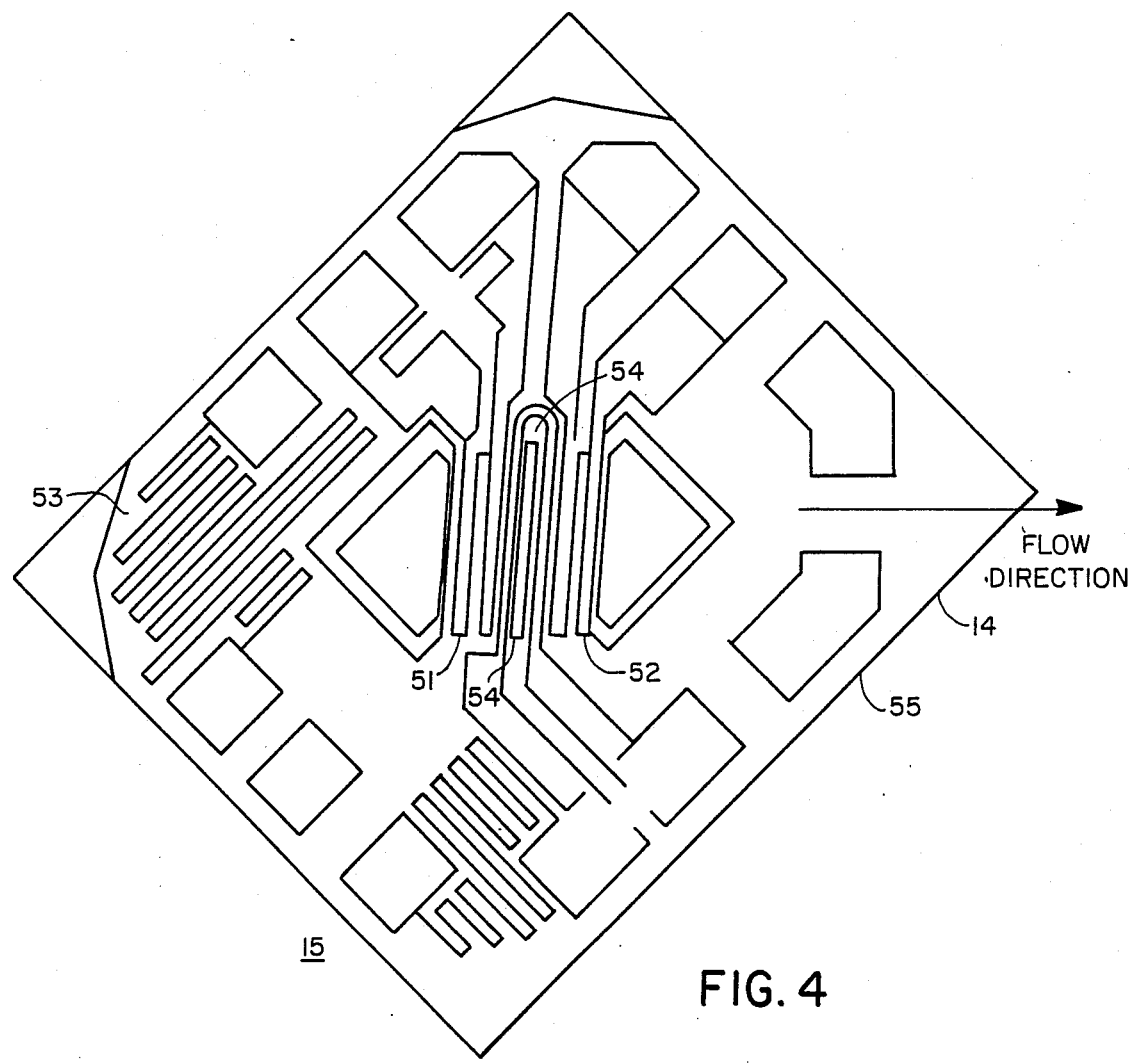
FIG. 4 is a plan view of a flow sensor of the compact gas meter provided by the present invention.

Referring to FIGS. 2 and 3, the sensor probe assembly 14 includes a mounting portion 47, including retaining collar 33, support portion 48, which extends into the through bore 21 and locates the solid state sensor 15, within the gas flow passageway defined by the through bore 21. The probe assembly has a connector portion 49 at its upper end which extends the conductors 32 from the sensor 15 to the analog circuit board 18. The solid state sensor 15, to be described in more detail, is a generally rectangular shaped member as shown in FIG. 4 and extends generally coplanar with the direction of flow of the gas through the gas passageway defined by through bore 21. As illustrated in FIG. 2A, the sensor 15 has an upstream end 15a and a downstream end 15b, and the sensor is located at approximately the mid-point of the passageway as illustrated in FIG. 2 by virtue of its mounting at the distal end of the probe assembly mount. The solid state sensor 15 is an immersion probe that directly senses gas flow through the gas conducting conduit. The principle of operation of the solid state sensor is similar to that of a miniature hot wire anemometer, but differs in that the solid state sensor requires less heating power, is more sensitive to gas flow, is more rugged, exhibits a faster response time, and can be fabricated using a batch fabrication process.

Figure 5:
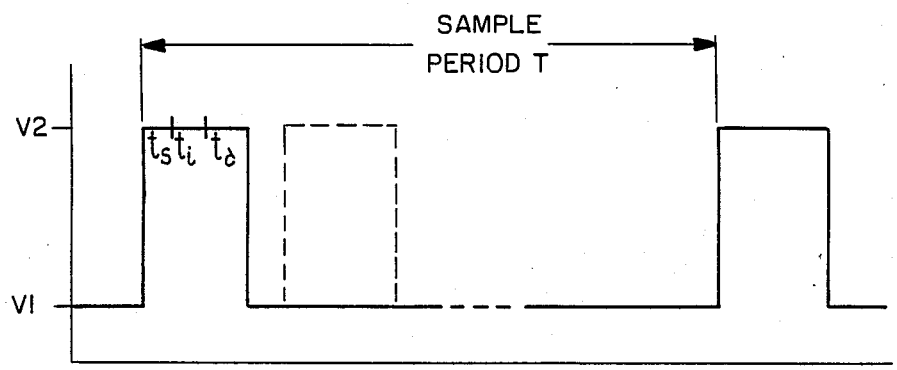
FIG. 5 is a timing diagram illustrating the operating cycle for the flow sensing circuitry.

Referring to FIG. 4, which is a plan view of the solid state flow sensor of the flow sensor probe assembly 14, the sensor consists of three sensors including an upstream flow sensor 51, a downstream flow sensor 52, a temperature sensor 53 and a heater element 54 all located on the same substrate 55. The thin film resistive heater 54 is flanked by the two resistive thin film temperature sensors 51 and 52. The upstream and downstream sensors 51 and 52 are connected to a differential amplifier circuit and each is driven by a current from an individually associated constant current source. One flow sensor is located upstream of the heater and one is downstream of the heater. As a result of gas flow through the passageway of the gas meter, the sensors respond to different quantities of heat generated by the heater. The differential response is used as an indication of the rate of gas flow across the bridge sensor arrangement defined by the two sensors 51 and 52 and the associated heater 54. Flow in either direction, i.e. from sensor 51 toward sensor 52 or from sensor 52 toward sensor 51, can be detected, the absolute value of the outputs will be the same in either case. In the absence of gas flow, the temperatures of the two sensors 51 and 52 are substantially the same. With gas flow over the semiconductor structure, the upstream sensor 51 is cooled and the downstream sensor 52 is heated. This results in an output signal which is detectable by the analog signal processing circuit 16a (shown in FIG. 6). As will be shown, the flow sensors 51 and 52 are sampled every T seconds and the temperature sensor 53 is sampled every kT seconds. The temperature sensor is used to compensate the gas meter 10 for temperature variations. The sampling period T is illustrated in FIG. 5 and will be described in detail hereinafter.

Figure 6:
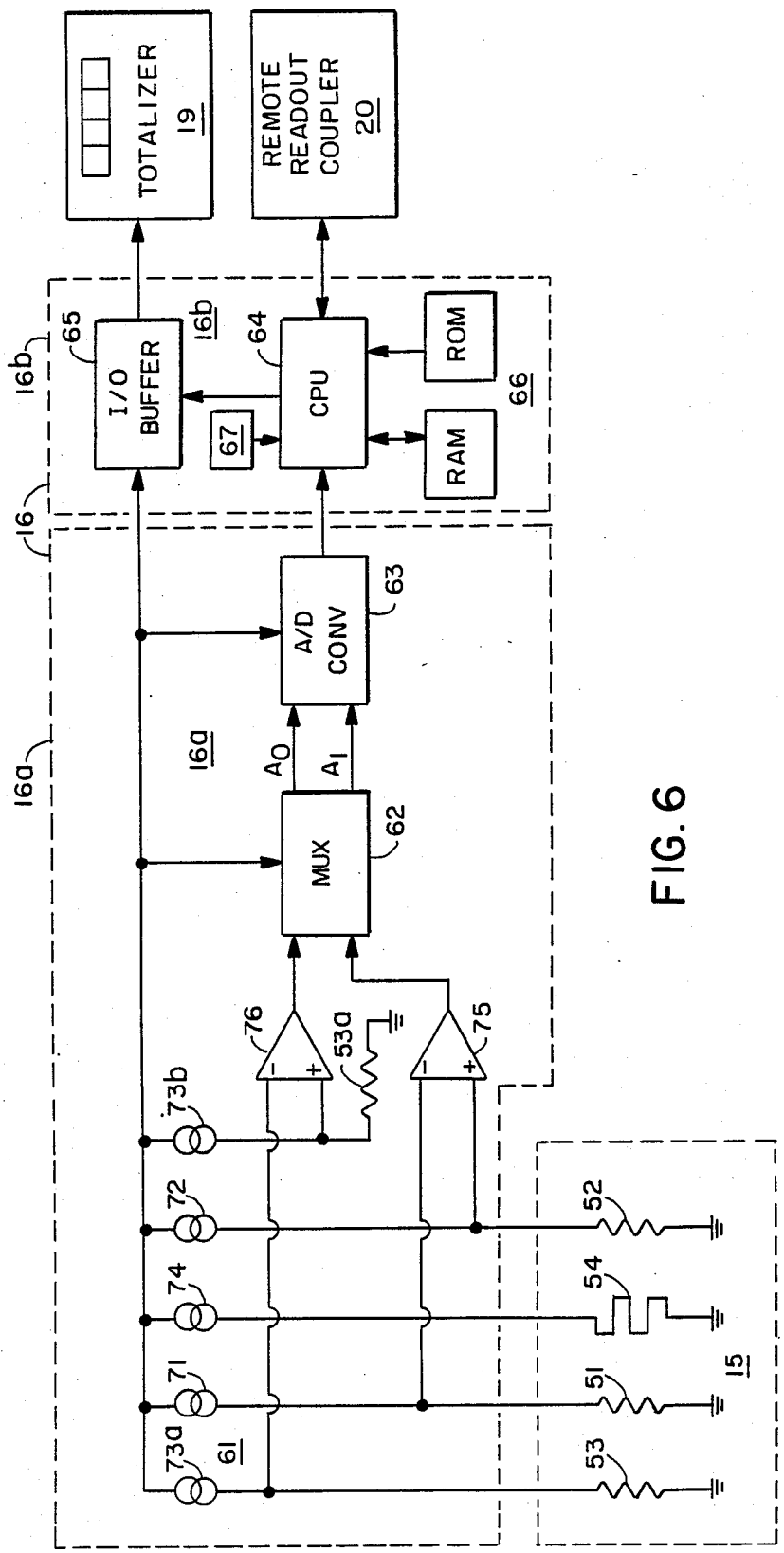
FIG. 6 is a block diagram of the electronic signal processing circuits of the compact gas meter provided by the present invention.

Sampling of the state of the flow sensors 51 and 52 and the temperature sensor 53, as well as the energization of the sensors and the heater 54 is provided by the electronic circuits 16 of the gas meter 10 which are shown in block diagram form in FIG. 6.

Referring to FIG. 6, the electronic circuits 16 include an analog-to-digital signal processing circuit 16a and a digital signal processing circuit 16b, which are mounted on the two printed circuit boards (FIG. 2), 17 and 18, respectively. The structure and function of the analog-to-digital signal processing circuit 16a and digital signal processing circuit 16b will be described hereinafter.

Figure 7:
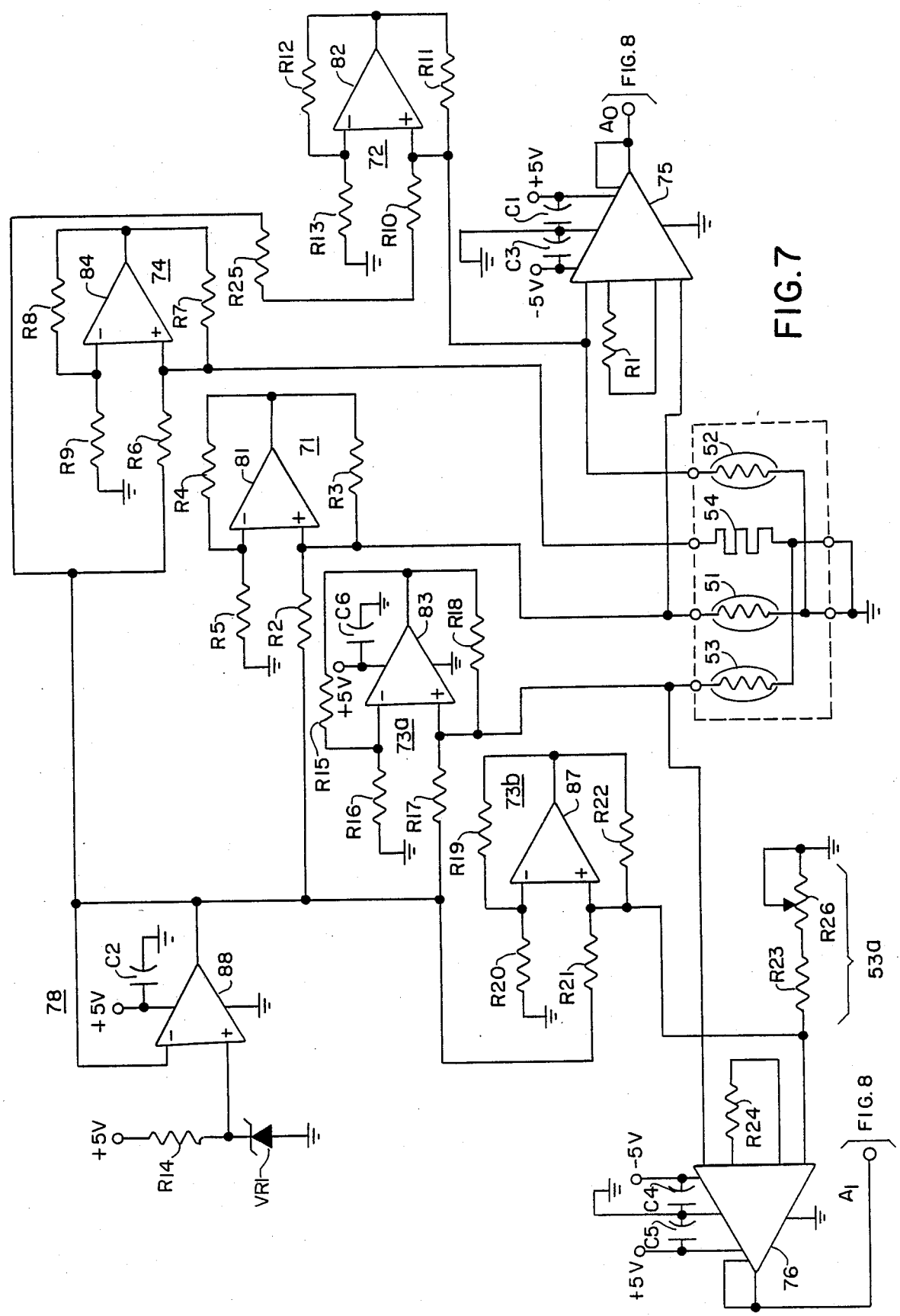
FIG. 7 is a schematic diagram of the drive and signal acquisition circuit of the electronic circuits of the compact gas meter.
Figure 8:
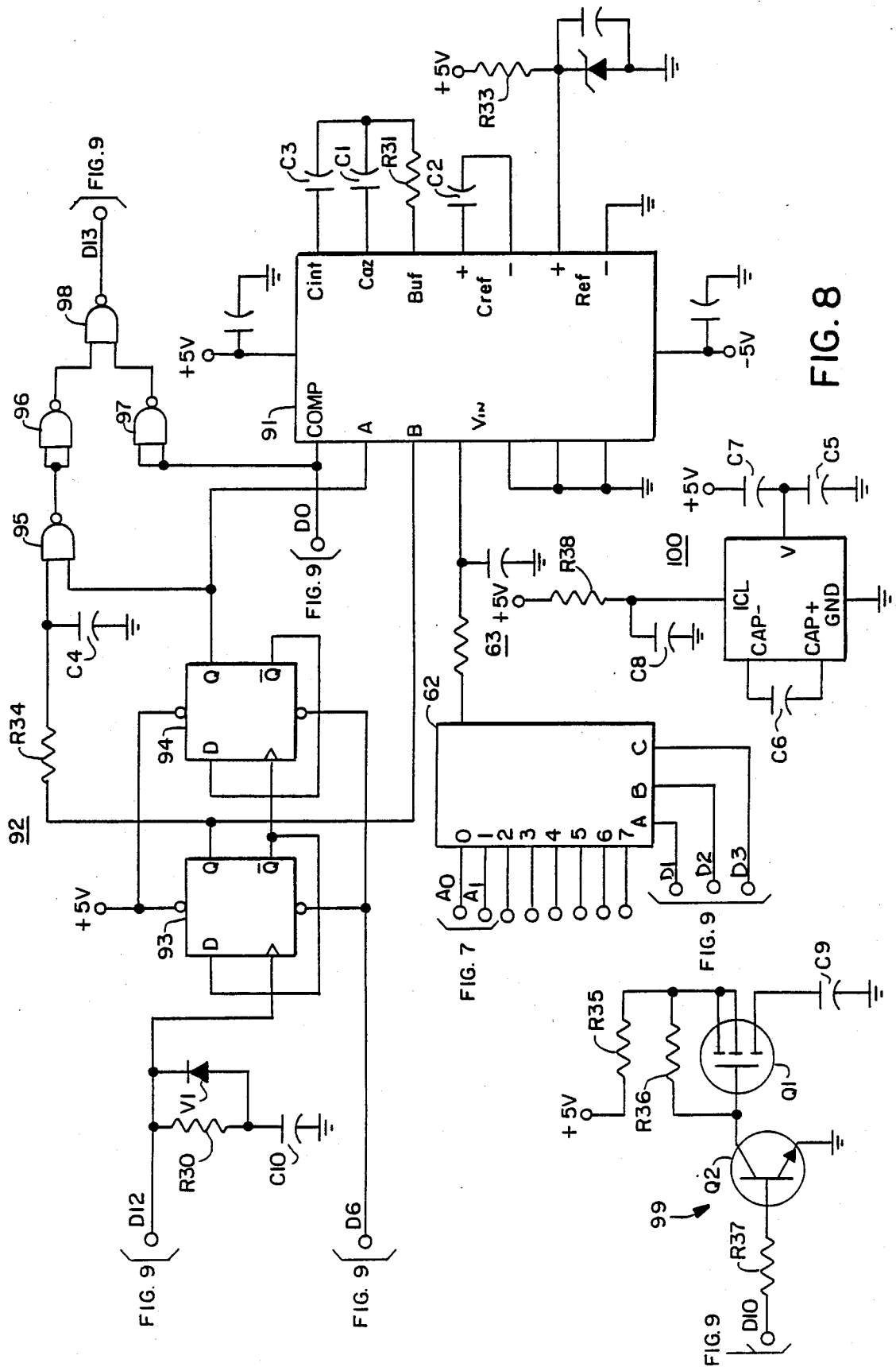
FIG. 8 is a schematic diagram of the analog-to-digital signal processing circuit of the electronic circuits.

Briefly, the analog-to-digital signal processing circuit 16a includes a drive and signal acquisition circuit 61 (FIG. 7), a multiplexing circuit 62 (FIG. 8), and an analog-to-digital converter 63 (FIG. 8). The digital signal processing circuit 16b (FIG. 9) includes a microprocessor system which includes a central processing unit CPU 64, an input/output buffer 65, memory circuits 66, and a real time clock 67.

Considering the flow sensor 15 (FIG. 6) in more detail, the flow sensor corresponds to the solid state sensor described in U.S. Pat. No. 4,651,564, and the construction, configuration and operation of the solid state sensor is described in detail in the U.S. Pat. No. 4,651,564, and accordingly will not be described in detail herein.

Briefly, with reference to FIG. 4, the flow sensor 15 comprises a pair of identical thin film heat sensors 51 and 52, a thin film heater 54 and a base or substrate 55 supporting the sensors and heater out of contact with the base. Sensors 51 and 52 are disposed on opposite sides of heater 56.

The heater resistor grid 54 operates at a preferred constant average temperature difference of 200 degrees centigrade elevated above the temperature of silicon chip or substitute 55 which temperature is not appreciably different from the ambient air temperature. The power required by heater resistor 54 to achieve 200 degrees centigrade above ambient temperature is very small being less than 0.010 watt.

In the preferred embodiment at zero gas flow velocity, thermal conduction from heater resistor grid 54, largely through the surrounding air space heats the identical temperature sensing resistor grids 51 and 52 to an average temperature of about 140 degrees centigrade or about 70 percent of the temperature elevation of heater element 54. In the preferred embodiment illustrated, sensor grids 51 and 52 are precisely symmetrically located with respect to heater grid 54 so that at zero gas flow they have identical temperatures and have no difference between their resistances. Consequently, a small probe current through both sensor resistances 51 and 52 will develop no voltage difference at zero gas flow velocity.

With gas flow present, upstream resistor sensor 51 will be cooled by the transportation of heat away from sensor 51 toward heater resistor grid 54, whereas the downstream sensor 52 will be heated by transportation of heat toward the sensor 52 from heat resistor grid 54. Consequently, a resistance difference between sensor resistances 51 and 52 will be present with a corresponding difference in voltage drop which is a measure of the gas flow. Typical unamplified voltage differences can be as high as 0.1 volt at a 1500 feet per minute flow velocity.

In the preferred operation of the solid state flow sensor, sensors 51 and 52 are driven with a constant current such that temperature field changes can be sensed under flow conditions as previously described. Other arrangements are also possible including arrangements which would operate the two temperature sensors in a constant voltage mode, a constant temperature (constant resistance) mode, a constant power mode, or any mode that produces a differential signal.

Referring now to FIG. 6, the temperature sensors 51 and 52 of the solid state flow sensor 15 are connected in arms 70 and 70a of a bridge network, the sensors 51 and 52 being energized by current supplied by respective constant current sources 71 and 72. The heater resistor 54 is energized by a further constant current source 74 and the reference temperature sensor 53 is driven by a constant current source 73a. The temperature sensor's other bridge leg is driven by constant current source 73b. The five constant current sources 71, 72, 73a, 73b and 74 are not continuously energized but are only energized during a sampling interval defined by the central processing unit 64 as will be shown.

The junction temperature sensors 51 and 52 are connected to the inverting and non-inverting inputs, respectively of a differential amplifier 75, the output of which is extended to the multiplexer 62. Reference temperature sensor 53 of sensor 15 and the temperature sensor's other bridge leg, which includes resistor 53a, are connected to the inverting and non-inverting inputs respectively of differential amplifier 76, the output of which is extended to multiplexer 62. The multiplexer circuit 62 operates under the control of the central processing unit 64 to selectively extend to the analog-to-digital converter circuit 63 the outputs of the differential amplifiers 75 and 76, representing the flow rate of the gas measured by the meter 10 and the reference temperature provided by temperature sensor 53. As indicated, the reference temperature reading is sampled less frequently than the flow rate signal provided by the differential amplifier 75.

The analog-to-digital converter circuit 63 receives the output extended thereto from the multiplexer circuit 62 and converts this output signal into a digital signal, which signal is applied to the central processing unit 64. The central processing unit 64 operates under program control to execute the operations necessary to effect the periodic readout of the information provided by the flow sensor, to enable the analog circuits to receive this information, to read this information from the output of the analog-to-digital converter 63 and to calculate the flow rate. The central processing unit 64 through input-/output drivers 65 causes the current meter flow rate information to be registered on the totalizer 19 and supplies suitable commands to the analog circuits 16a to effect the sampling procedure. The central processing unit 64 also supplies information or data to a remote transmitting unit 20 enabling meter reading information and other information to be transmitted to a remote interrogation station, and to receive information and commands from such remote interrogation station to effect or alter the operation of the electronic circuits of the gas meter 10.

FIG. 7 is a schematic circuit diagram of the drive and signal acquisition circuits 61 that interface the solid state sensor 15 with the rest of the analog-to-digital signal processing circuit 16a. Each of the five constant current sources 71, 72, 73a, 73b and 74 are comprised of an operational amplifier 81, 82, 83, 87 and 84, respectively, each having respective resistive networks which provide the desired current levels. A circuit 78 provides a stable 2.5 VDC reference voltage for the five operational amplifiers current sources that drive the temperature bridge, the sensor bridge and the heater of the solid state sensor 15. Amplifier 88 is a voltage follower that provides a high to low impedance transfer function between the 2.5 VDC reference and the five constant current source inputs.

Amplifiers 83 and 87 are the constant current source drives for the onboard temperature sensor 53. Amplifier 83 sources 100 microamps through the temperature sensor 53. Amplifier 87 current sources 100 microamps through the ambient temperature bridge reference leg resistance 53a. The temperature bridge current is set by resistors R17 and R21. The temperature bridge output is applied to an input of amplifier 76, the output of which is connected via signal channel A1 to the multiplexer circuit 62 (FIG. 6).

The flow sensor defines three sensor elements including upstream sensor 51, downstream sensor 52 and heater 54. These elements are driven by respective constant current sources 71, 72 and 74 having associated operational amplifiers 81, 82 and 84, respectively. The two flow sensors are operated with constant currents of 400 microamps each. The heater 54 is operated at a constant current the current level being set by resistor R6. Flow sensor current for sensor 51 is set by resistor R2. The sensor current for the downstream sensor 52 is set by resistor R10 and bridge balance is provided by resistor R25.

The output of the flow sensor bridge is amplified by amplifier 75. The gain for amplifier 75 is set by resistor R1. The signal output of the amplifier is filtered by a filter network comprised of resistor R30 and capacitor C10 and passed through a second signal channel A0 of the analog multiplexer.

Referring to FIG. 8, the analog-to-digital converter 63 includes a programmable A/D converter circuit 91, a two-bit counter 92 defined by data latches 93 and 94 and associated output logic gates 95–98, a power switch circuit 99 and an inverting voltage source 100 which converts +5 VDC to −5 VDC for the programmable analog converter 91. The multiplex circuit 62 is associated with the analog-to-digital converter circuit 63 and circuits 62 and 63 comprise an integrating converter analog processor such as the type commercially available from Quartic Systems, Inc. as the Model TADC-1 A/D converter.

The analog-to-digital converter features variable length conversions, adjustable from 9 bit resolution to 16 bit resolution by programming of the device by the user. The analog-to-digital circuit 63 is characterized by variable power consumption, typically 25 mw when on, 0 mw when off. The compact gas meter 10 operates at 16 bit resolution. The A/D input voltage is scaled so that 2.5 VDC provides a full scale reading of 200 cubic feet per hour. Therefore, 16 bits provides 65,536 levels of resolution or 0.003 CHF/level. This resolution is more than adequate at the lower flow rates where the output is nearly linear with flow.

Because the multiplexer circuit 62 and the analog-to-digital converter 63 comprise a commercially available unit as mentioned above, these circuits will not be described in detail. Briefly, the multiplexer circuit 62 comprises the type 4051 8 input multiplexer having two of its inputs labeled FLOW and TEMP connected to the outputs of amplifiers 75 and 76, respectively of the signal acquisition circuit (FIG. 7). The multiplexer circuit includes three input select inputs A, B, and C, which are selectable by signals applied thereto by over control output lines D1–D3 of the central processor unit (FIG. 9) as will be shown.

The two-bit counter comprises a pair of data latches 93 and 94 connected in tandem with each connected for operation as a pulse divider to step the analog-to-digital converter through four conversion modes. The input stage data latch 93 has its clock input connected to a control output D12 of the central processing unit to receive a clocking pulse therefrom. The false output of latch 93 is connected to the clock input of data latch 94. The true outputs of the two data latches are combined by NAND gate 95 which is connected to an invertor defined by NAND gate 96. The output of gate 96 is connected as one input to NAND gate 98, a second input of which is connected to an invertor 97. Invertor 97 has its input connected to the output COMP of the programmable analog converter 91. Output COMP is also connected to a signal input D0 of the central processing unit and the output of gate 98 is connected to a further input D13 of the central processing unit. Gates 94–98 provide the necessary logic to set input D13 appropriately for transmitting the result of the conversion to the central processing unit input D0 signals the polarity of the sampled analog voltage to the central processing unit.

The central processing unit also controls the operation of the analog-to-digital converter to the extent that an output on control line D6 effects reset (prior to each conversion sequence) of the two-bit counter 92. An output on control line D10 enables power switch circuit 99 to apply power at +V to the analog-to-digital circuits and to the flow sensor.

Figure 9:
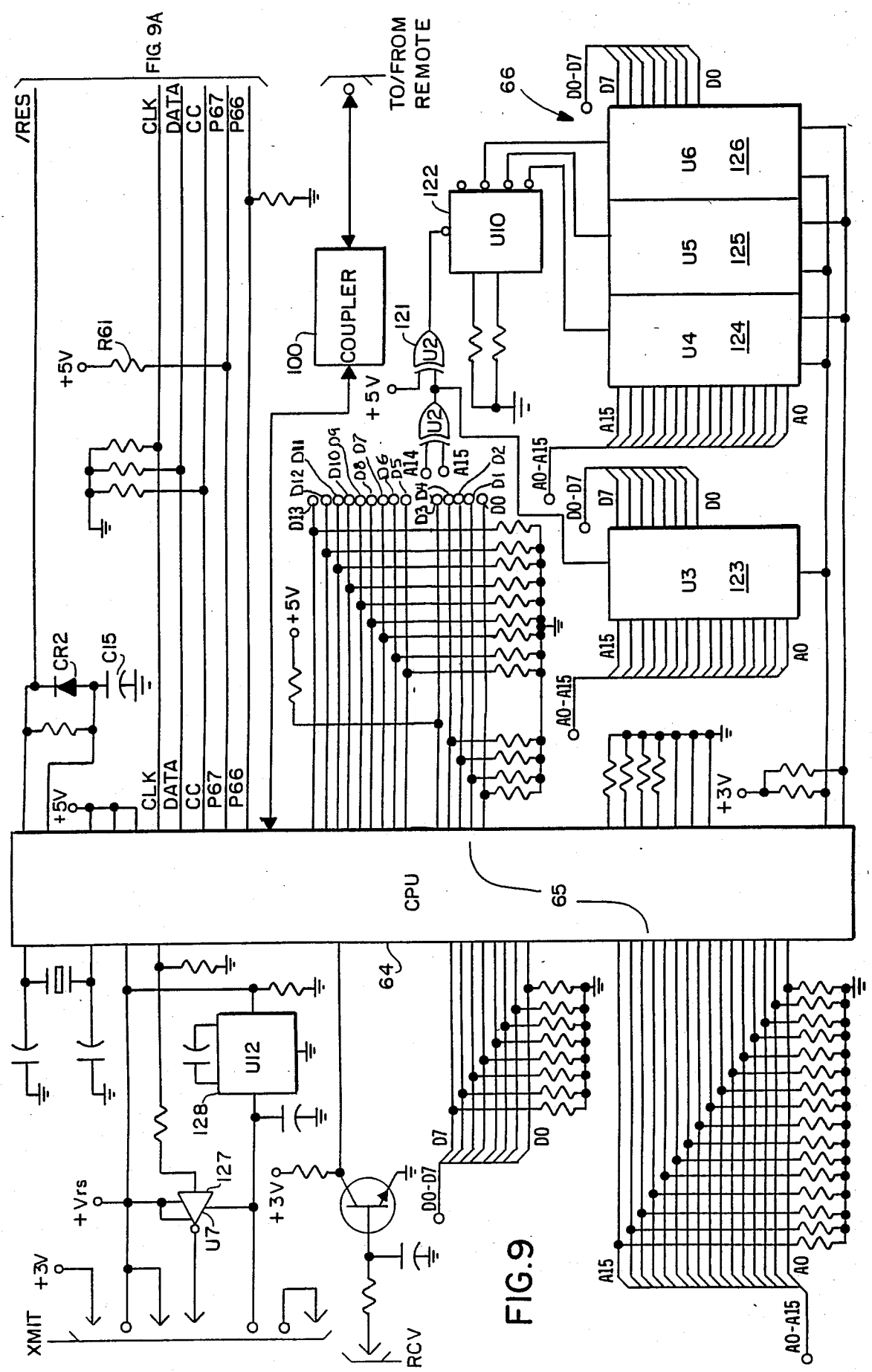

Referring now to FIGS. 9 and 9A, the digital signal processing circuits provide the control signals for the analog-to-digital converter, as indicated, process data incoming from the flow of sensor 15, including calculating flow rates and updating the totalizer. The processing unit may transmit information to a remotely located interrogate station (not shown) and receive information and commands therefrom via an interface network 100 using RF signaling or telephone line communication as is known in the art.

The digital signal processing circuit includes the central processing unit 64, memory circuits 66, the remote interface network 65, and a real time clock 67. The central processor includes 16 address inputs connected over an address bus 111 to the memory circuits 66, eight data outputs D0-D8 which are connected via a data bus as inputs to the memory 66, and fourteen control/input ports D0-D13 which supply information to and receive information from the analog-to-digital converter circuit 16a.

As indicated, the central processing unit 64 provides the control signals for the analog-to-digital converter circuits. The control line functions are shown in Table I along with the default functions for these lines.

TABLE I

| Line | Default Use | Use | |
|------|-------------|-----|---|
| D0 | none | POL | input for polarity detection |
| D1,D2,D3 | none | ENA | selects analog MUX channel |
| D4 | none | | drive signal for accumulator |
| D6 | none | RST | output for system reset |
| D10 | none | PWR | output for power control |
| D12 | TONE | CLK | output for clocking mode |
| D13 | PERIOD | EDC | input for end-of-conversion |

Referring to FIG. 9, the central processing unit 64 provides the following major functions for the compact gas meter 10:

1. All control functions for the analog-to-digital converter;
2. Control of power on-time to the analog-to-digital converter and sensor circuits including defining a sleep mode;
3. Reads the output on the analog-to-digital converter for flow rate and ambient temperature and computes the necessary correction factors required to correct for flow, temperature or pressure if necessary; and
4. Keeps track of accumulated flow and outputs to the totalizer 19 or other media such as RF or telephone modem for remote readout mode via the interface network 100.

For the digital signal processing circuits shown in FIGS. 9 and 9A, circuits 121 (U2) and 122 (U10) provide encoding for chip selection. Circuit 123 (U3) is a 32K by 8 bit Eprom memory for program storage. Circuit 124 (U4) provides 32K by 8 bit static RAM for program development and storage. Circuits 125 (U5) and 126 (U6) provide 32K by 8 bit static RAM data storage. Circuits 127 (U7) and 128 (U12) interface the central processing unit 64 with a RS 232 mode to enable down or up loading of data or for interfacing the central processing unit 64 with another computer.

Circuit 67 (U9) defines a real time clock circuit which provides real time data for use by the central processing unit in specifying the time of occurrence of gas flow, etc.

The central processing unit 64 is an 8 bit CMOS microcomputer such as the type 63 A03Y commercially available from Hitachi. Moreover, the entire digital signal processing circuits illustrated in FIGS. 9 and 9A, may comprise the microprocessor system commercially available as the Model III Tattletale commercially available from Onset Computer Corporation.

The totalizer 19 may be the HECON series GO634, for example. Output D4 of the central processing unit increments the totalizer 19.

Referring to FIG. 10,. which is a functional block diagram of the electronic circuits of the gas meter 10, the digital circuits 16b control the application of dc power to the sensor 15 and the analog-to-digital circuit 16a, central processing unit of the digital circuits providing an output on line D10 for enabling power switch 99 which responsively extends Vdc to the sensor 15 and the analog circuits 16a. The central processing unit controls the analog circuits 16a over control lines D1-D3, D6 and D12 and receives outputs from the analog circuits 16a over lines D0 and D13. The signal outputs of the sensor 15 is extended to the analog circuits 16a over lines A0 and A1, which outputs are the flow and reference temperature, respectively.

Control outputs D1-D3 control the multiplexer circuit 62 to provide selection for the signal on line A0 or line A1 for the analog circuits. Control output D6 resets the analog-to-digital converter 63. Control output D12 sequences the analog-to-digital converter. Input D10 enables the central processing unit to detect the polarity of the analog signal being processed and input signals D13 indicates end of conversion operation for the analog-to-digital converter.

The central processing unit operates under program control to first call a power up routine to energize the analog circuits 16a and the sensor 15. The central processing unit then calls a conversion routine and controls the analog-to-digital converter in taking a reading of the sensor flow value and reference temperature value and returns the results of the conversion to the central processing unit. The central processing unit then calls a power down routine to deenergize the analog circuits 16a and the sensor 15. Finally, the central processing unit increments the totalizer 19 to reflect the most recent gas flow reading.

The procedure by which the sensor output is sampled is dependent upon two parameters. The first is the sample period, T, which dictates the frequency of the sampling. The second is the number of samples, k, which are integrated when computing the current volumetric flow rate.

Referring to FIG. 4, in the exemplary embodiment, the sampling period T is one second. Voltage V1 is a fixed offset voltage set by resistor 1226 (FIG. 7) at the input of amplifier 76. The voltage V2 is the sensor voltage response. This response varies as a function of the flow rate past the sensor. This signal is amplified by amplifier 75 prior to application to the analog-to-digital converter. The total conversion time is typically about 112 ms and includes a settling time is of about 60 ms, and integration time ti of about 24 ms for a 16-bit conversion, and a deintegration time td which varies proportionally to the analog-to-digital converter input voltage.

The balance of the cycle time is the data processing period. A running average of a plurality of raw signal samples is used to compute the volumetric flow reading which is used to update the flow counter. A similar A/D conversion is made on the output of the temperature sensor, but is done only once every 32 samples.

More specifically, a running average of the most recent "k" samples of the differential responses is maintained by the meter. The "k" sample values are stored in the data memory, the set of sample values being updated each sampling by substituting the current or "newest" sample value for the "oldest" sample value. The average of this updated set of "k" samples is used as the current reading of gas flow. This average is used to compute, using a table look-up derived from meter calibration data, the corresponding volumetric flow rate for the current sample period. Various methods for obtaining calibration data are known in the art. The flow rate sample is compensated for ambient temperature variations using a temperature compensation derived from the last sample output obtained from the reference temperature sensor 53. The compensated value is multiplied by a time value T yielding the volume of gas usage for the current sample period. This volume measurement is then added to the meter's flow accumulation register in memory. This register is then compared with a flow resolution register established for the meter and the mechanical totalizer 19 is incremented each time a given flow volume is measured. By way of example, the flow resolution register value is set at 100 cubic feet (cf), the mechanical totalizer 19 is stepped each time that the flow accumulation register count equals or exceeds this value. The reading stored by the accumulation register is reduced by 100 cf each time that the totalizer is incremented.

In the exemplary embodiment, a fixed sample period is used in the sampling of the sensor for the gas meter 10. It is possible to make the sampling period, T, a function of the flow rate and the acceleration of the flow rate, i.e., rate of change, as measured by the meter. When a variable sampling rate is used, the sampling rate is set higher during high flow rates to decrease error and set lower during low flow rates, where the accuracy specification is more lenient, to decrease power consumption. On a time scale of one year depending on the environment, the average flow rate is likely to fall into the lower flow rate range, and thus use of a variable sampling rate can be used to reduce power consumption. Also, when the acceleration of the flow rate is low, i.e. not changing significantly, sampling can be carried out on a lower frequency basis whereas when the acceleration is high, a faster sampling rate is employed.

With reference to FIGS. 6 and 10, the central processing unit 64 operates under program control to read the information provided by the flow sensor 15, via the analog-to-digital converter, update the flow reading information stored by the central processing unit and to periodically update the current gas flow volume reading and update the state of the totalizer 19. The central processing unit defines a sleep mode and periodically energizes the flow sensor 15 and the analog-to-digital circuit 16a for a brief sampling interval, maintaining these circuits energized only during the sampling interval.

In the exemplary embodiment, the information is read once every second. First, the central processing unit enables power switch 99 (FIG. 8) to apply power to the flow sensor 15, and the analog-to-digital circuit 16a, including the analog multiplexing circuit 62 and the analog-to-digital converter circuit 63. The central processing unit then defines a stabilizing period ts to enable the flow sensor heater to stabilize. Then the processor reads the gas flow rate sensor. As indicated, the temperature sensor 53 is read at a slower rate, or that is, less frequently, than differential output of the flow sensors 51 and 52 to conserve time and thus power because the circuits are shut down after each sampling sequence. Reading the temperature less frequently does not affect accuracy because the temperature will not slew as fast as the flow data will.

The running average is used in order to account for noise which could otherwise adversely affect the gas flow readings obtained. The central processing unit defines a "sliding window" which basically comprises a running average of the data taken over a given interval, or a number of data samplings, for example, thirty-two. With each sampling operation, the oldest value is deleted and the newest value is added and averaged with the previous 31 values. This running average of thirty-two readings may vary relative to the direction of change of the flow rate. Data obtained for each reading is averaged into this running average and used as the current reading. A test is made prior to this averaging and if the data does not compared favorably, then the latest obtained data is ignored. Thus, for example, if the reading from one sample to the next sample changes from a certain value to zero, for example, it can be assumed that noise or some other error has created this change and the reading is ignored. This comparison reduces the effect of the bad reading and eliminates or substantially reduces the susceptibility to noise.

Figure 11:
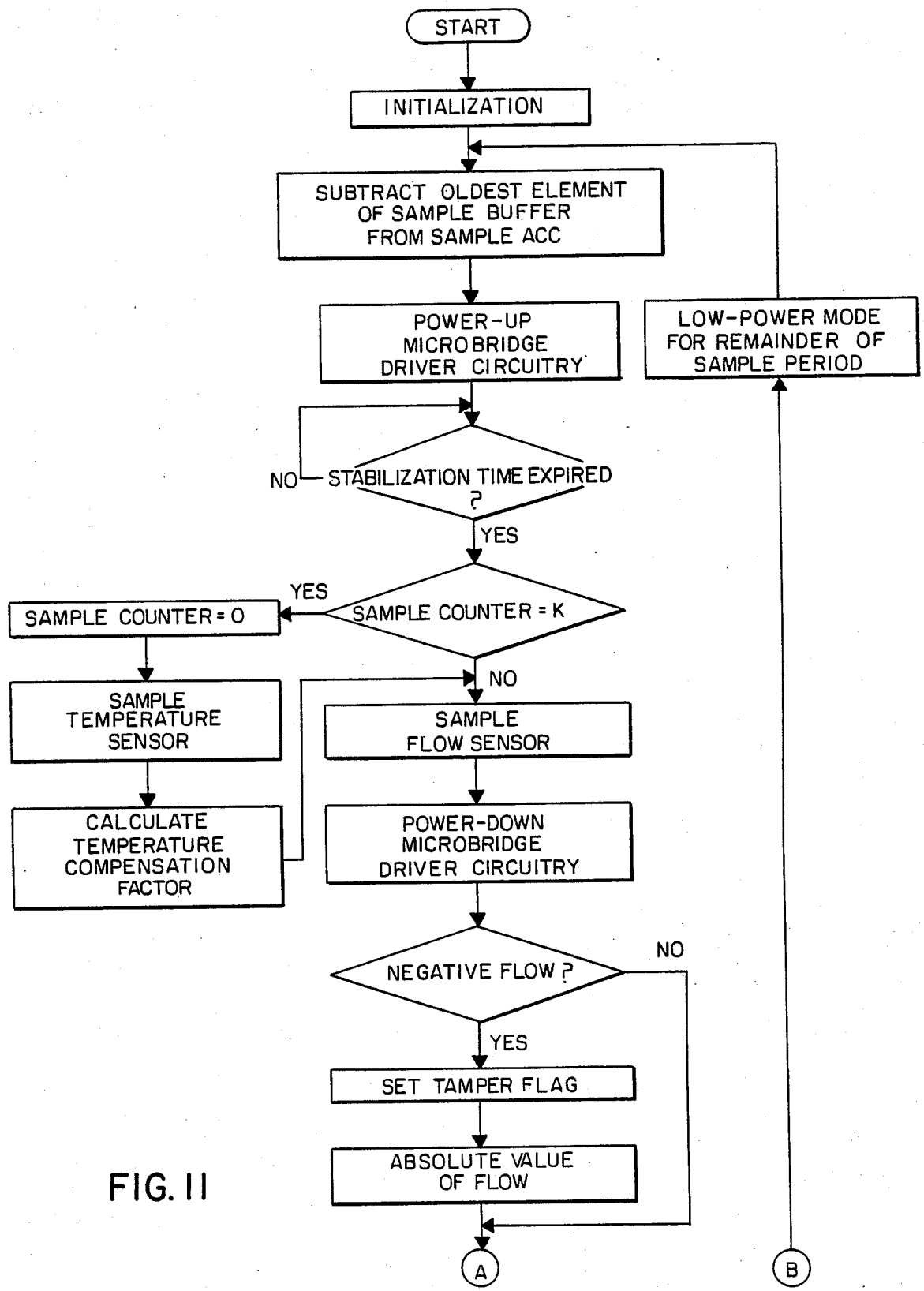
Figure 11A:
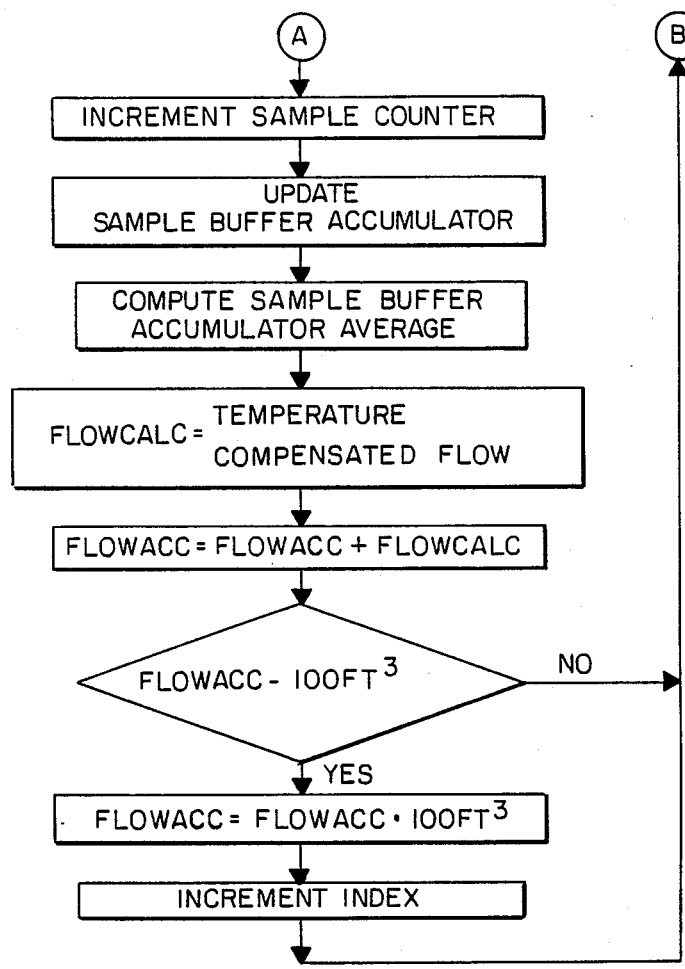

Referring to FIGS. 11 and 11A, there is illustrated a process flow chart for the central processing unit. Upon startup, the program first executes an initialization routine. After initialization, the first step in the program is to adjust the running average of the "sliding window" by subtracting the oldest element of the sample buffer from the sample accumulator. Then the central processing unit enables power circuit 99 (FIG. 8) to energize the analog circuitry and the flow sensor, and after the stabilization time has expired, a test is made to determine if it is time to read the temperature sensor. If so, the sample counter is set to zero, the temperature sensor output is sampled and the temperature compensation factor is calculated and stored as an updated temperature compensation factor. Then the program returns to the main flow. At this point, or if the test indicated that it was not time to sample the temperature sensor, the program continues and samples the flow sensor. After the sampling operation is completed, the analog-to-digital circuits and the flow sensor 15 are deenergized. Then a test is made to determine if the direction of the flow is negative, indicative of tampering with the meter by reversing its connections to the gas pipe link. If the flow rate signal is negative, then the absolute value of the flow rate signal is used n the flow rate calculation and a tamper flag is set.

Then the sample counter is incremented and the sample buffer accumulator is updated. The sample accumulator average, including the current measurement sample and the precious 31 samples, is computed and the flow rate is calculated using the most recent temperature compensation flow factor. Then the current flow rate is added to the accumulated flow rate stored in the flow rate register and a test is made to determine if the flow rate register count is greater than or equal to a value corresponding to 100 cubic feet. If not, the program loops back to the beginning, remaining in low power mode for the remainder of the sample period. If the flow accumulator value is equal to or greater than the resolution value, then the flow register value is adjusted to subtract one unit (100 cf) and the totalizer 19 is incremented by one.

The central processing unit continues under program control to transfer the flow sensor and the analog circuits to the power up mode, to sample the output signals provided by the flow (and temperature) sensors and store the information before deactivating the flow sensor and the analog circuits. The reading is stored in memory and thus stored information is used to increment the mechanical totalizer as each 100 cf unit of gas flow is measured.

We claim:

1. A compact gas meter for measuring usage of natural gas or the like by a consumer over a time interval to enable billing of the consumer by a utility, comprising: a housing having a passageway therethrough with a gas inlet adapted for connection to a source of natural gas provided by the utility and a gas outlet adapted for connection to gas utilization means of the consumer, gas flow sensing means mounted on said housing and including a solid state flow sensor having a substrate bearing a thin film heating element and first and second thin film temperature sensing elements flanking said heating element, and means locating said flow sensor in said passageway to directly sense gas flow through said passageway, said flow sensor being oriented to extend generally coplanar with the direction of flow of the gas through said passageway, with one of said temperature sensing elements located upstream of the gas flow through said passageway and the other one of said temperature sensing elements located downstream of the gas flow, said flow sensor being operable when energized to provide an output signal indicative of gas flow rate through said passageway, signal processing circuit means mounted within said housing and electrically connected to said flow sensor, said signal processing circuit means including signal sampling means for periodically sampling the output signal provided by said flow sensor during sampling periods and generating a signal representative of gas flow volume over a predetermined time interval, power switch means responsive to said signal sampling means for energizing said flow sensor during said sampling periods, said signal sampling means defining operating cycles for said power switch means, each operating cycle including an active period of a given duration and an inactive period of a substantially longer duration, said power switch means energizing said flow sensor enabling said flow sensor to provide its output signal only during the active period of each operating cycle, and indicating means controlled by said sampling means to provide an indication of the gas flow volume measured by the gas flow sensor.

2. A gas meter according to claim 1, wherein said signal sampling means samples said output signal of said flow sensor at a fixed sampling rate.

3. A gas meter according to claim 2, wherein said signal sampling means samples said output signal a plurality of times during the active period of each operating cycle.

4. A gas flow meter according to claim 1, wherein said signal sampling means defines the sampling period for sampling said output signal of said flow sensor as a function corresponding to the flow rate of gas through said passageway for a given time duration.

5. A gas flow meter according to claim 1, wherein said signal sampling means defines the sampling period for sampling said output signal of said flow sensor as a function corresponding to the rate of change of the flow rate for a given time duration.

6. A gas flow meter according to claim 1, wherein said signal sampling means includes sensor, signal detecting means for detecting said output signal, and signal processing means connected to said signal detecting means and responsive to said output signal for generating a gas flow volume output signal indicative of gas flow volume over a given time interval and applying said gas flow volume output signal to said indicating means.

7. A gas flow meter according to claim 6, wherein said signal processing means averages the values of successive output signals of said flow sensor over a time interval in generating said gas flow volume output signal.

8. A gas flow meter according to claim 7, wherein said signal processing means includes signal accumulating means for accumulating signals corresponding to the gas flow volumes represented by a series of said output signals of said flow sensor and the average value of the gas flow volume represented by said accumulated output signals accumulated by said signal accumulating means, and wherein for each successive sampling period, said signal processing means adds to said accumulated signals a signal corresponding to the value of the gas flow volume represented by the current output signal and subtracts from said accumulated signals a signal corresponding to the value of the gas flow volume of the first of the series of the accumulated output signals.

9. A gas flow meter according to claim 6, wherein said flow sensor includes reference sensor means providing a reference output signal indicative of ambient temperature, said detecting means including means for detecting said reference signal, and said signal processing means responding to said reference signal to compensate the flow rate output signal for changes in ambient temperature relative to a preselected value.

10. A gas meter according to claim 9, wherein said signal processing means samples said signal output of said reference sensor means at a rate substantially less than the sampling rate for said gas flow sensor.

11. A gas meter according to claim 6, wherein said signal sampling means is adapted for energization by a battery and wherein said power switch means connects said flow sensor to the battery during said active periods.

12. A compact gas meter associated with a building for measuring usage of natural gas or the like, therewithin by a consumer, said gas meter comprising: indicating means for providing an indication of gas flow volume over a time interval to enable billing of the consumer by a utility, a housing having a passageway therethrough with a gas inlet adapted for connection to a source of natural gas provided by the utility and a gas outlet adapted for connection to gas utilization means of the consumer, gas flow sensing means mounted on said housing and including a solid state flow sensor and means locating said flow sensor in said passageway to directly sense gas flow through said passageway, said flow sensor being oriented to extend generally coplanar with the direction of flow of gas through said passageway, said flow sensor being operable when energized to provide an output signal indicative of gas flow through said passageway, signal processing circuit means mounted within said housing and electrically connected to said flow sensor, said signal processing circuit means including signal sampling means for periodically sampling the output signal provided by said flow sensor and generating a signal representative of gas flow volume over a predetermined time interval, power switch means responsive to said signal sampling means for energizing said flow sensor during said sampling period; said signal sampling means defining operating cycles for said power switch means, each operating cycle including an active period of a given duration and an inactive period of a substantially longer duration, said power switch means energizing said flow sensor enabling said flow sensor to provide its output signal only during the active period of each operating cycle, said indicating means being controlled by said sampling means to provide an indication of the gas flow volume measured by the gas flow sensor.

13. A gas meter according to claim 12, wherein said signal sampling means includes signal detecting means for detecting said output signal, and signal processing means connected to said signal detecting means and responsive to said output signal for generating a gas flow volume output signal indicative of gas flow volume over a given time interval and applying said gas flow volume signal to said indicating means.

14. A gas meter according to claim 13, wherein said signal processing means averages the values of output signals provided over a number of successive sampling intervals to provide an average output signal for use in calculating the gas volume flow volume output signal for each sampling interval.

15. A gas meter according to claim 14, wherein said signal processing means adjusts said average output signal in accordance with calibration data for the gas meter prior to applying the averaged output signal to the indicating means.

16. A compact gas meter for measuring usage of natural gas or the like by a consumer over a time interval to enable billing of the consumer by a utility, comprising: a housing having a passageway therethrough with a gas inlet adapted for connection to a source of natural gas provided by the utility and a gas outlet adapted for connection to gas utilization means of the consumer, gas flow sensing means mounted on said housing and including a solid state flow sensor and means locating said flow sensor in said passageway to directly sense gas flow through said passageway, said gas flow sensor including a first thin film temperature sensing element and a second thin film temperature sensing element located downstream of said first temperature sensing element and a thin film heater element located between said first and second temperature sensing elements, said flow sensor being oriented to extend generally coplanar with the direction of flow of gas through said passageway, circuit means connecting said first and second temperature sensing elements in a balanced bridge configuration to enable said flow sensor when energized to provide an output signal indicative of gas flow through said passageway signal processing circuit means mounted within said housing and electrically connected to said flow sensor, said signal processing circuit means including signal sampling means for periodically sampling the output signal provided by said flow sensor and generating a signal representative of gas flow volume over a predetermined time interval, power switch means responsive to said signal sampling means for energizing said circuit means and said flow sensor during said sampling periods, said signal sampling means defining operating cycles for said power switch means, each operating cycle including an active period of a given duration and an inactive period of a substantially longer duration, said power switch means energizing said circuit means and said flow sensor only during the active period of each operating cycle, and indicating means controlled by said signal sampling means to provide an indication of the gas flow volume measured by the gas flow sensor.

17. A gas meter according to claim 16, wherein said flow sensor comprises a reference temperature sensor for providing a reference output signal indicative of ambient temperature, said signal sampling means including means for detecting said reference output signal and for compensating said output signal of said flow sensor for variations in ambient temperature from a given value.

18. A gas meter according to claim 17, wherein said signal sampling means comprises signal multiplexing means, analog-to-digital converter means and processor means, said signal multiplexing means being controlled by said processor means to selectively extend said flow signal and said reference signal to said analog-to-digital converter means, said analog-to-digital converter means being controlled by said processor means to convert analog signals extended thereto to digital signals, said processor means using said digital signals to compute gas flow volume signals for application to said indicating means.

19. A gas meter according to claim 16, wherein said housing comprises a base portion having said passageway formed therethrough and a cover portion constructed and arranged for mounting on said base portion defining a compartment, said signal processing circuit means being mounted within said compartment, and said gas flow sensing means including a probe assembly, said base portion having a passageway communicating said compartment with said passageway in said base portion, said probe assembly being mounted in said aperture with one end carrying said flow sensor located in said passageway and another end extending adjacent to said signal sampling means facilitating connection of the signal output of said flow sensor to a signal input of said signal sampling means.

20. A compact gas meter for measuring usage of natural gas or the like by a consumer over a time interval to enable billing of the consumer by a utility, comprising: a housing having a base portion and a cover portion, gas flow sensing means, signal sampling means, and indicating means, said base portion having a passageway therethrough with a gas inlet adapted for connection to a source of natural gas provided by the utility and a gas outlet adapted for connection to gas utilization means of the consumer, and said base portion having an aperture communicating said passageway with an upper surface of said base portion, said gas flow sensing means including a solid state flow sensor having first and second thin film heat sensor elements and support means supporting said sensor elements, and mounting means mounted on said base portion in said aperture thereof, locating said flow sensor in said passageway with one of said elements positioned upstream of the other element and with said sensor located approximately at the mid-point of said passageway to directly sense gas flow through said passageway, said flow sensor being operable when energized to provide an output signal indicative of gas flow in either direction through said passageway, said signal sampling means being mounted on said upper surface of said base portion and connected to said flow sensor, said signal sampling means being operable to periodically sample the output signal provided by said flow sensor and generate a signal representative of gas flow volume over a predetermined time interval, said signal sampling means defining operating cycles for said flow sensor, each operating cycle including an active period of a given duration and an inactive period of a substantially longer duration, said flow sensor being energized to provide its output signal only during the active period of its operating cycle, said cover portion adapted for mounting on said base portion enclosing said flow sensing means, said signal sampling means, and said indicating means therewithin, said cover portion having a window therein, and said indicating means being mounted adjacent to said window and exposed to view therethrough and being controlled by said sampling means to provide an indication of the gas flow volume measured by the gas flow sensor.

21. A compact gas meter for measuring usage of natural gas or the like by a consumer over a time interval to enable billing of the consumer by a utility, comprising: a housing having a passageway therethrough with a gas inlet adapted for connection to a source of natural gas and a gas outlet adapted for connection to gas utilization means, gas flow sensing means mounted on said housing and including a solid state flow sensor and means locating said flow sensor in said passageway, said gas flow sensor including first temperature sensing means and second temperature sensing means located downstream of said first temperature sensing means and heater means located between said first and second temperature sensing means, circuit means connecting said first and second temperature sensing means in a balanced bridge configuration to enable said flow sensor when energized to provide an output signal indicative of gas flow through said passageway, signal sampling means for periodically sampling the output signal provided by said flow sensor and generating a signal representative of gas flow volume over a predetermined time interval, said signal sampling means including processor means and analog-to-digital converter means enabled by said processor means to convert analog signals provided by said flow sensor to digital signals for use by said processor means in calculating gas flow volume signals, said processor means obtaining the absolute value of said analog signals for calculating said gas flow volume signals to thereby enable measurement of gas flow through said passageway in either direction, power switch means responsive to said signal sampling means for energizing said circuit means and said flow sensor during said sampling periods, said signal sampling means defining operating cycles for said power switch means, each operating cycle including an active period of a given duration and an inactive period of a substantially longer duration, said power switch means energizing said circuit means and said flow sensor only during the active period of each operating cycle; and indicating means controlled by said signal sampling means to provide an indication of the gas flow volume measured by the gas flow sensor.

* * * * *